United States Patent [19]
Broer et al.

[11] Patent Number: 5,506,704
[45] Date of Patent: Apr. 9, 1996

[54] CHOLESTERIC POLARIZER AND THE MANUFACTURE THEREOF

[75] Inventors: Dirk J. Broer; Johan Lub, both of Eindhoven, Netherlands

[73] Assignee: U.S. Philips Corporation, New York, N.Y.

[21] Appl. No.: 179,420

[22] Filed: Jan. 10, 1994

[30]     Foreign Application Priority Data

Jan. 11, 1993  [EP]  European Pat. Off. ............... 93200055
Nov. 2, 1993  [EP]  European Pat. Off. ............... 93203057

[51] Int. Cl.$^6$ .......................... G02B 5/30; G02F 1/1335; C09K 19/36
[52] U.S. Cl. .......................... 359/63; 252/299.7; 252/585; 359/65; 359/105; 359/500
[58] Field of Search ................................. 359/63, 64, 65, 359/103, 105, 490, 492, 500; 252/585, 299.7

[56]                References Cited

U.S. PATENT DOCUMENTS 4,410,570  10/1983  Kreuzer et al. ....................... 427/374.1
5,132,147  7/1992  Takiguchi et al. .................... 427/393.5
5,188,760  2/1993  Hikmet et al. ....................... 252/299.01

FOREIGN PATENT DOCUMENTS 2010529  6/1979  United Kingdom .
2017579  10/1979  United Kingdom .

OTHER PUBLICATIONS

"Polarizing Color Filters Made from Cholesteric LC Silicones" Maurer et al, SID 90 Digests, 1990 pp. 110–113.

Primary Examiner—Martin Lerner
Attorney, Agent, or Firm—Michael J. Balconi-Lamica

[57]              ABSTRACT

A broadband cholesteric polarizer is described, as well as a method of manufacturing such a polarizer. Said polarizer comprises an optically active layer of a polymer material having a cholesteric order, said material being oriented so that the axis of the molecular helix extends transversely to the layer. In accordance with the invention, the polarizer is characterized in that the pitch of the molecular helix in the layer is varied in such a manner that the difference between the maximum pitch and the minimum pitch is at least 100 nm. The optically active layers are preferably provided on substrates which bring about a conversion of circularly polarized light into linearly polarized light. Three different methods of manufacturing such broadband polarizers are described.

17 Claims, 5 Drawing Sheets

CHOLESTERIC POLARIZER AND THE MANUFACTURE THEREOF

BACKGROUND OF THE INVENTION

The invention relates to a cholesteric polarizer comprising an optically active layer of a polymer material having a cholesteric order, the material being oriented in such a manner that the axis of the molecular helix extends transversely to the layer. The invention also relates to methods of manufacturing such polarizers. The invention further relates to a lighting device comprising a socket for an electric light source, a reflector and such a cholesteric polarizer which is preferably provided with a quarter-wave plate.

Polarizers are used to convert unpolarized light into polarized light. Until now so-called "sheet polarizers" have been used for this purpose. When said sheet polarizers are exposed to unpolarized light they transmit one of the two orthogonically linearly polarized components of the light, while the other component is absorbed in the polarizer. Such polarizers have the drawback that under optimum conditions maximally only 50% of the quantity of incident light is converted into polarized light. Thus, this type of polarizers has a relatively low efficiency. Another drawback relates to the absorption of the untransmitted component. This may give rise to considerable heating of the polarizer, which causes undesired changes in the polarization characteristic of the polarizer and, at high intensities of the incident light, can even lead to destruction of the polarizer.

By means of cholesteric polarizers it is possible to very efficiently convert unpolarized light into polarized light. Such polarizers comprise an optically active layer of a cholesteric (i.e. chiral nematic) material. In this type of liquid crystalline material the chiral molecules have a structure such that they spontaneously assume a spiral-like or helical structure. After such a mixture has been provided as a thin, optically active layer between two parallel substrates, said helical structure is oriented in such a manner that the axis of the helix extends transversely to the layer. A better orientation of the helix is obtained if the substrates are provided with so-called orientation layers on the surfaces facing each other. If this type of polarizer is irradiated with a beam of unpolarized light, the part of the light which is "compatible" with the (right-handed or left-handed) direction and pitch of the helix is reflected, while the remainder of the light is transmitted. By means of a mirror, the "compatible" polarization of the reflected light can be reversed, after which said light, which is now "incompatibly" polarized, can again be directed on to the polarizer. In this manner and using this type of polarizer, theoretically, 100% of the incident unpolarized light having a "compatible" wavelength can be convened into circularly polarized light.

Such a cholesteric polarizer is known from an article by Maurer et al., entitled "Polarizing Color Filters Made From Cholesteric LC Silicones", from SID 90 Digests, 1990, pp. 110–113. In this article a description is given of cholesteric polarizers whose optically active layer consists of a polymer material having a cholesteric order on the basis of silicones. This layer is manufactured by orienting a mixture of a chiral silicone monomer and a nematogenic silicone monomer between two substrates of glass, after which they are polymerized to the optically active layer by means of UV light. The ratio between the two types of monomer in the polymer material governs the pitch of the molecular helix and the reflection wavelength (= colour of the reflection) associated therewith. The ratio between the pitch p and the wavelength $\lambda$ is given by the formula $\lambda=\frac{1}{2}.(n'+n")p$, where $n'$ and $n"$ are the extraordinary and the ordinary refractive index, respectively, of the polymer material.

An important drawback of the known cholesteric polarizer is that the bandwidth $\Delta\lambda$ of the polarized light is much smaller than the bandwidth of the visible spectrum. This bandwidth is determined by the formula $\Delta\lambda=\lambda.\Delta n/\bar{n}$, where $\Delta n=n'-n"$ represents the birefringence of the layer and $\bar{n}=(n'+n")/2$ represents the average refractive index. The bandwidth in the visible portion of the light spectrum is governed predominantly by the birefringence of the cholesteric material. The possibilities of increasing said birefringence are relatively limited. In practice it has been found that $\Delta n$ is smaller than 0.3, so that the associated bandwidth is smaller than 100 nm. In general, the bandwidths have values ranging between 30 and 50 nm. This small bandwidth is problematic for many applications. In practice, polarizers having a bandwidth of at least 100 nm, and preferably 150 nm and more are desired. In particular bandwidths which cover an important portion of the visible spectrum are very interesting for industrial applications.

In the above-mentioned article this known problem is overcome by the use of polarizers which are built up of a number of optically active layers having different reflection wavelengths. In this manner, a polarizer having a bandwidth of 300 nm can be obtained which covers substantially the entire visible portion of the spectrum. However, this solution has a number of important drawbacks. First, the optical quality of cholesteric polarizers consisting of more than one optically active layer deteriorates rapidly due to errors which are typical of cholesterics. Said errors are, in particular, so-called "focal-conical" disclinations, "Grandjean"-disclinations and a loss of planar molecular order. Second, the thickness of such a composite polarizer causes problems. As the thickness of the individual layers must minimally be 6 microns, such composite polarizers have a minimum thickness of approximately 20 microns. At such thicknesses of the optical layer, the polarizer becomes excessively dependent on the viewing angle.

SUMMARY OF THE INVENTION

It is an object of the invention to provide a polarizer in which the above drawbacks are overcome. The aim of the invention is, more in particular, to provide a polarizer which is compact and of a simple construction and which can be manufactured in a simple manner. The bandwidth of the intended polarizer should be larger than that of the known polarizers and should preferably comprise a substantial portion of the visible spectrum. The invention also aims at providing methods of manufacturing such polarizers in an efficient and cost-effective manner as well as lighting devices comprising such a polarizer.

These and other objects of the invention are achieved by a polarizer of the type mentioned in the opening paragraph, which is characterized according to the invention in that the pitch of the molecular helix in the layer is varied in such a manner that the difference between the maximum pitch and the minimum pitch is at least 100 nm.

In the known single cholesteric polarizers the pitch across the optically active layer is substantially constant. As the pitch in the optically active layer of the inventive polarizer varies, bandwidths of at least 160 nm can be realised. As will be explained hereinafter, polarizers having a bandwidth in excess of 250 nm have been manufactured which bandwidth covers substantially the entire visible portion of the light spectrum (400–640 nm). This bandwidth is sufficient for many applications. As the inventive polarizer comprises only one optically active layer, the above-mentioned drawbacks of the known multilayer polarizer do not occur.

In accordance with a preferred embodiment of the invention, the inventive polarizer is characterized in that the pitch of the molecular helix increases substantially continuously from a minimum value at one surface of the layer to a maximum value at the other surface of the layer. By means of this particular configuration it is attained that the helical structure of the cholesteric material, viewed in the direction of the normal to the layer, changes gradually. This precludes the occurrence of material stresses in the optical layer and has a favourable effect on the strength of said layer.

Another favourable embodiment of the polarizer according to the invention is characterized in that the polymer material forms a three-dimensional network. Optically active layers which consist of such a three-dimensional network are exceptionally strong. In practice they can suitably be used as self-supporting polarization films. That is, said optically active layers need not be provided with substrates. After the manufacture of such cholesteric polarizers the substrates which are necessary for the orientation and polymerization can be removed. This has a favourable effect on the compactness of the polarizer. Further it has been found that this particular type of polarizer has the additional advantage that the temperature dependence of the polarization characteristic is extremely small.

A further interesting embodiment of the cholesteric polariser in accordance with the invention is characterized in that the optically active layer is present on a substrate of a stretched synthetic resin film, the degree of stretching and the thickness of the film being selected in such a manner that the optical retardation of the film is approximately 0.25 times the wavelength of the band reflected during operation of the polariser.

The light which is passed through a cholesteric polarizer is circularly polarized. For a number of applications it is desirable that the emergent light is linearly polarized instead of circularly polarized. In that case, the polariser in accordance with the last-mentioned preferred embodiment is provided on a substrate of stretched synthetic resin film. Since the substrate is stretched in-plane in one direction, the refractive indices in said direction and in the in-plane direction perpendicularly to the direction of stretching are different. The refractive index difference and the thickness of the film can be selected in such a manner that the product of these quantities (optical retardation) corresponds substantially to 0.25 times the wavelength of the (centre of the) bandwidth reflected by the polariser. As a result, this substrate serves as a quarter-wave plate which converts circularly polarized light into linearly polarized light. The synthetic resin film may be manufactured of, for example, polyethylene terephthalate, polycarbonate, polyethylene ketone or polypropylene.

If the inventive polarizer is constructed as a self-supporting layer, said layer can be directly provided on such a substrate of stretched synthetic resin film, which substrate can serve as an additional support for the polariser. Since such a polariser does not have to be provided with separate substrates, a compact "linear polariser" is obtained in this manner. It is alternatively possible, however, that the stretched synthetic resin film already serves as a substrate in the manufacture of the optically active layer. This benefits the ease of manufacture.

A further interesting embodiment of the cholesteric polariser in accordance with the invention is characterized in that the optically active layer is present on a substrate of two stretched synthetic resin films of different composition, the directions of stretching of both films extending substantially transversely to each other, and the degree of stretching of both films being selected in such a manner that, due to the difference in dispersion between the films, the net retardation of the substrate is substantially equal to 0.25 times the wavelength over a substantial portion of the reflected bandwidth of the polariser.

By means of this embodiment it can be achieved that for a substantial portion of the reflected bandwidth the optical retardation is substantially equal to 0.25 times the wavelength. When a single stretched synthetic resin film is used, the optical retardation remains the same over the entire bandwidth. As a result, the conversion from circularly polarized light into linearly polarized light is not optimal over the entire bandwidth. This is a disadvantage, particularly, in broadband polarisers.

The invention also relates to methods of manufacturing the polariser in accordance with the invention. A first method is characterized in that a mixture of chiral and nematogenic monomers, each having a different reactivity, is provided in the form of a layer between two parallel substrates, after which actinic radiation is applied in accordance with a radiation profile whose intensity varies over the layer, so that the mixture is polymerised to an optically active layer of polymer material having a cholesteric order, whereafter, if desired, the substrates are removed from the optically active layer.

A second method of manufacturing the inventive polariser is characterized according to the invention in that a mixture of chiral and nematogenic monomers, each having a different reactivity, is provided on a substrate in the form of a layer, after which actinic radiation is applied in accordance with a radiation profile whose intensity varies over the layer, so that the mixture is polymerised to an optically active layer of polymer material having a cholesteric order, whereafter, if desired, the substrate is removed from the optically active layer.

In general, it holds that the pitch of the molecular helix is governed to an important degree by the ratio between the chiral and the mesogenic monomer in the polymer material. Owing to the difference in reactivity between both monomers, the capture probability of the most reactive monomer is greater than that of the least reactive monomer. If during the polymerization of the mixture, which is initiated by actinic radiation, a variation in the radiation intensity is realised across the optically active layer to be formed, the most reactive monomer is preferentially incorporated in the polymer at the location(s) of the highest radiation intensity. As a result, one or more concentration gradient(s) of free monomer is (are) formed during said polymerization process. This causes monomer diffusion from locations with a low monomer concentration to locations with a high monomer concentration. The monomers of high reactivity will diffuse to the place(s) where the radiation intensity is highest. The monomers of low reactivity, however, will diffuse to the place(s) where the radiation intensity is lowest. This leads to an increase in reactive monomer in areas of the formed polymer material where, during the polymerization process, the radiation intensity was highest. As a result, the composition of the polymer material varies in the direction transverse to the polymer layer. This causes a variation in the pitch of the molecular helix in the layer, which molecular helix is formed by the polymer. This variation of the pitch provides the optically active layer with a large bandwidth, the value of which is proportional to the value of the variation in pitch. In the first method, the mixture can be provided between the substrates by means of a pipette and vacuum techniques. In the second method, the mixture can be provided on the substrate by means of a so-called "doctor's blade" or by means of screen printing. The second method clearly is more suitable for mass production. The time-consuming filling of narrow spaces between substrates is omitted in the second method.

It is noted that in theory the variation of the pitch of the molecular helix can be realised on the basis of the temperature dependence of the pitch of cholesteric polymers. In this case a temperature gradient must be provided across the optically active layer of the mixture of monomers, after which photopolymerization has to take place. Due to the small thickness of the optically active layer, typically a few micrometers to several tens of micrometers, this approach leads in practice to great problems caused by the required slope of such a temperature gradient.

It is further noted that in said inventive methods it is not absolutely necessary to use substrates which are provided with orientation layers on the surface facing the optically active layer. Particularly in the manufacture of (very) thin optically active layers spontaneous orientation of the nematogenic groups generally occurs. However, the presence of orientation layers during polymerization leads to an improved orientation of the optically active layer, so that the optical properties of the polarisers are substantially improved.

For the reactive monomers use can be made of compounds comprising a reactive group on the basis of acrylates, epoxy compounds, vinyl ethers and thiolene systems, as described in, inter alia, U.S. Pat. No. 5,188,760. Monomers having a different reactive group generally differ in reactivity. Said reactivity is also governed by the reaction conditions under which the polymerization operation is carried out, such as temperature, wavelength of the actinic radiation used, etc.

An interesting variant of the above-mentioned methods is characterized according to the invention in that the number of reactive groups of the chiral monomer differs from that of the nematogenic monomer. When such a mixture of monomers is photopolymerized a three-dimensional network is formed because at least one of the two types of monomers comprises two or more reactive groups. As noted above, such a polymer network gives great strength to the optical layer, so that after the photopolymerization process the substrates used, including any orientation layers, can be removed from the optical layer, if desired, so that a self-supporting broadband polarization filter is obtained. Monomer mixtures in which one type of monomer comprises one reactive group and the other type of monomer comprises two reactive groups are preferred.

The use of such a mixture of monomers comprising only one and the same type of reactive group has an additional advantage. As a result of a smaller capture probability, monomers having one reactive group are less reactive than monomers having two reactive groups. By virtue thereof and despite the fact that one and the same type of reactive group is used, a concentration gradient can be realised in the photopolymerization process. The use of said two types of reactive monomers in a mixture offers the advantage of improved mixing of these monomers. Very good results are obtained with monomer mixtures in which one monomer has one acrylate group and the other monomer has two acrylate groups.

Photopolymerization takes place by means of actinic radiation. This is to be understood to mean irradiation with light, preferably UV-light, X-rays, gamma rays or irradiation with high-energy particles, such as electrons or ions. Polymerization can be carried out in several ways. For example, by means of a coherent radiation source (laser) a periodical variation of the pitch of the molecular helix can be obtained. Constructive and destructive interference is used to form an interference pattern in the optically active layer, so that during the polymerization operation a periodical variation of the light intensity straight through the layer occurs.

A simpler polymerization method is obtained if a non-coherent radiation source is used whose wavelength is chosen to lie in the range where the maximum of the sum of the absorptions of the monomers used and the photoinitiator is found. In this case a relatively large gradient of the light intensity across the optically active layer can be obtained without taking additional measures.

A very convenient method is characterized according to the invention in that the mixture also comprises a dye having an absorption maximum whose wavelength corresponds substantially to the wavelength of the actinic radiation used. An important advantage of this method is that it offers great freedom as regards the choice of the layer thickness, the photoinitiation system, the polymerization wavelength and the polymerization rate. As the quantity of dye can be selected at will within certain limits, independent of the other components of the mixture to be polymerized, the (linear) intensity gradient of the radiation across the optically active layer can be adjusted very accurately via the concentration of the dye. Preferably, a dye is used whose absorption maximum lies outside the wavelength range in which the polarizer must operate. In this manner, undesired absorptions during the use of the finished polarizer are precluded.

A third interesting method of manufacturing the inventive polariser is characterized in that a surface of an optically active layer of polymerised liquid crystalline material having a cholesteric order is provided with a film of reactive monomers which cause a concentration gradient in the layer as a result of diffusion, after which the monomers are polymerised.

Said method is based on known optically active layers of polymerised liquid crystalline material of cholesteric order, as described in, inter alia, U.S. Pat. No. 5,132,147 and U.S. Pat. No. 4,410,570. In these known optically active layers, the pitch of the molecular helix across the layer is substantially constant. The diffusion of the monomers in the optically active layer causes this layer to swell up slightly. This swelling leads to an increase of the pitch of the molecular helix. Said increase causes the reflection wavelength values to augment in situ. Consequently, the provision of a concentration gradient of monomer across the thickness of the optically active layer results in a variation of the pitch of the molecular helix. As a result, a broadband cholesteric polariser is obtained.

Due to the polymerization of the monomers the diffusion in the optically active layer is stopped. Further diffusion would eventually lead to a narrow-band polariser whose reflection wavelength exceeds that of the initial optically active layer. For the reactive monomers use can be made of molecules comprising nematogenic groups. However, this is not necessary. Since the diffusion causes an increase of the pitch of the molecular helix, the initial, optically active layers should have a reflection which corresponds to the smallest desired wavelength. Consequently, for the manufacture of broadband polarisers which must be operative in the entire visible range of the spectrum, use should be made of a cholesteric layer having a reflection band in the blue region of the visible spectrum.

An interesting variant of the third method in accordance with the invention is characterized in that the film comprises a mixture of monomers having different diffusion rates in the layer. It has been found that the use of a single type of monomer does not always yield satisfactory results. This can be attributed to the formation of a sharp reflection peak. The use of two or more monomers having different diffusion rates causes the reflection peaks to overlap. This results in a broadband behaviour of the polariser.

Another interesting variant of the third method in accordance with the invention is characterized in that at least a part of the monomers comprises two or more polymerisable groups. This measure yields a broadband, optically active layer of considerable strength. Polymerization of the monomers leads to a three-dimensional network. By virtue thereof, the possibility of further diffusion of these monomers after the polymerization operation is further reduced.

The invention further relates to a lighting device comprising a socket for an electric light source, a reflector and a cholesteric polarizer which is preferably provided with a quarter-wave plate. This device is characterized in that a cholesteric polarizer in accordance with the invention is used therein. By means of such a lighting device polarized light can be produced with a high efficiency. If the polarizer comprises a quarter-wave plate, the light produced is linearly polarized. Devices producing linearly polarized light are particularly suitable for indoor applications (for example office and shop lighting) and outdoor applications (for example car and street lighting). The inventive device can also be used in liquid crystal displays. In linearly polarized light, reflections and scattering occur to a lesser degree than in circularly polarized light. In the absence of a quarter-wave plate, the inventive device produces circularly polarized light.

In the device in accordance with the invention, a discharge lamp can be used as the electric light source, in which, during operation, a discharge arc is generated, for example between two electrodes, in a discharge tube. Examples of this type of light sources are high-pressure discharge lamps, such as high-pressure Na, Hg or metal halide lamps. Low-pressure discharge lamps, such as fluorescent lamps or low-pressure Na lamps, can also suitably be used. Alternatively, an incandescent body in an airtight lamp envelope can be used as the light source in the lighting device in accordance with the invention. The lamp envelope may be evacuated or it may contain a filler gas. Said filler gas may be inert or based on a halogen gas. Halogen lamps are a good example of the last-mentioned class of electric light sources. It is noted that the light source may be detachably provided in the device, for example by means of a screw thread or bayonet fixing. It is alternatively possible, however, that the light source and the socket for said light source are inextricably interconnected.

The reflector serves to reflect the light generated by the light source during operation of the inventive device in the direction of the polarizer. The surface of the reflector facing the light source consists of a material having a high reflection coefficient for the light of the light source to be used. For applications with visible light, inter alia, metals and alloys having a good reflectivity can suitably be used, such as preferably gold, silver and aluminium, the latter being much cheaper. The reflector can be self-supporting but generally consists of a metal layer which is vapour-deposited on to a housing.

The cholesteric polarizer of the inventive device preferably comprises a quarter-wave plate for converting circularly polarized light into linearly polarized light. Said quarter-wave plate may be connected to the cholesteric polarizer as a separate optical element. Preferably, the polarizer and the quarter-wave plate are integrated so that they form an individual optical element. In the latter case, said quarter-wave plate may consist of a stretched synthetic resin film which was used as the substrate of the optically active layer in the manufacture of the polarizer. The invention will be explained in greater detail by means of exemplary embodiments and the drawing, in which

It is noted that, for clarity, the individual components of the Figures are not drawn to scale.

DETAILED DESCRIPTION OF THE PREFERRED EMBODIMENTS

Figure 1A:
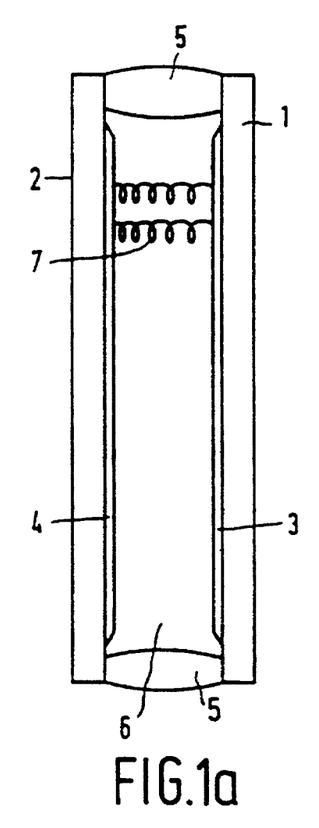
FIGS. 1a to 1c diagrammatically shows a number of embodiments of cholesteric polarizers in accordance with the invention.

FIG. 1a shows a first embodiment of a polarizer in accordance with the invention. Said polarizer comprises two flat, transparent glass substrates 1 and 2 which extend parallel to each other and are located at some distance from each other. The facing surfaces of the substrates are provided with an orientation layer 3 and 4, respectively, for example of rubbed polyimide or sputtered $SiO_x$ and the edges are provided with a spacer 5.

An optically active layer 6 is present between both substrates. Said layer consists of a polymer material having a cholesteric order. The axis of the molecular helix of the cholesteric material extends transversely to the layer. The pitch of the molecular helix is varied in the layer, said pitch increasing continuously from one surface of the optically active layer to the other surface. In the present case this is diagrammatically shown by means of two spiral-shaped structures 7. The thickness of the optically active layer typically ranges from 3 to 40 micrometers, preferably from 5 to 25 micrometers.

Figure 2A:
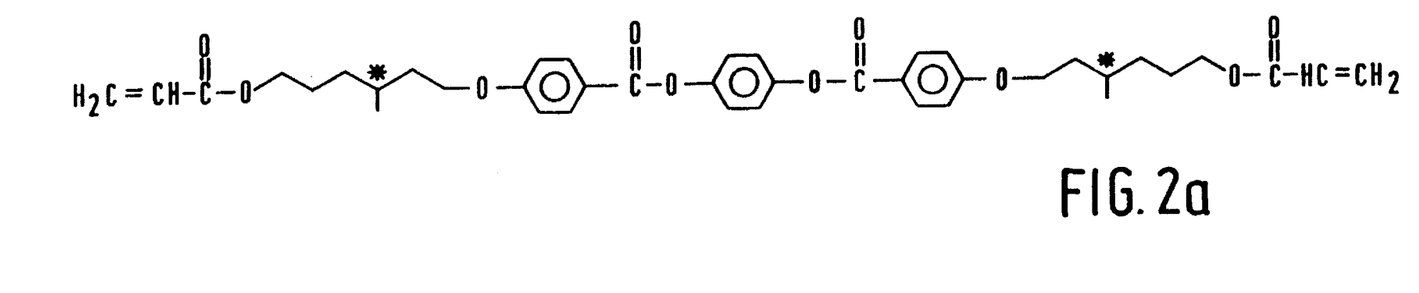
FIGS. 2a and 2b shows the chemical structural formulas of two monomers which can be used in the manufacture of a cholesteric polarizer according to the invention.
Figure 2B:
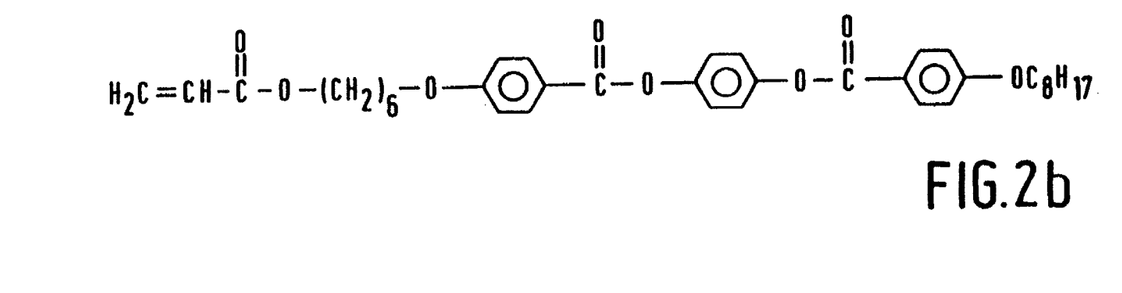
Figure 3:
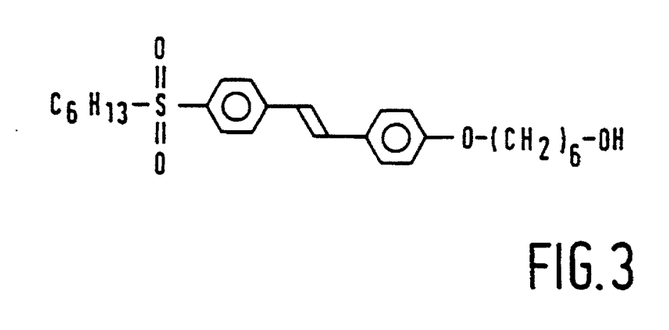
FIG. 3 shows the chemical structure of a dye which can be used in the manufacture of a polarizer according to the invention.

The above-described embodiment of the cholesteric polarizer in accordance with the invention was manufactured as follows. First, a mixture of reactive monomers was prepared. This mixture comprises 60 wt. % of the chiral component A and 40 wt. % of the nematogenic component B. Component A comprises two reactive acrylate groups per molecule and component B comprises one reactive acrylate group per molecule. The exact structural formulas of the components A and B are shown in FIG. 2. Owing to the different number of reactive groups per molecule, both monomers have a different reactivity. Subsequently, 0.5 wt. % of the photoinitiator Igacure-651 (Ciba Geigy) and 50 ppm of p-methoxyphenol (stabilizer) and a quantity of a dye are added to this mixture. The chemical structure of this dye is shown in FIG. 3. This dye exhibits an absorption maximum around 334 nm and an extinction coefficient of 31524 l/mol.cm.

The mixture thus manufactured was then provided between two transparent substrates. Said substrates carried a layer of rubbed polyimide. Said layers are used to orient the molecular helix which forms spontaneously in the cholesteric mixture. To preclude the formation of disclinations both substrates were sheared over a small distance until a planar order was obtained. Subsequently, the reactive mixture was photopolymerized by means of UV-light for 8 minutes at room temperature. As one of the two reactive monomers comprises two reactive groups per molecule, a three-dimensional polymer network is formed during polymerization. Due to the strength of the optical layer thus formed, the optical layer could be detached from both substrates and used as a self-supporting cholesteric polarizer.

A number of the above-described polarizers was manufactured, the quantity of dye added being varied as well as the wavelength ($\lambda$) and the incident power (Io) of the UV-light. Subsequently, the bandwidth of this polarizer was measured. Table 1 shows the bandwidth which corresponds to a certain quantity of dye added.

TABLE I

| Dye concentration (wt %) | Bandwidth (nm) | | |
|---|---|---|---|
| | Io = 0.62 mW/cm$^2$ | Io = 0,058 mW/cm$^2$ | Io = 0.15 mW/cm$^2$ |
| 0 | 41 | 41 | 45 |
| 0.33 | 55 | 133 | 126 |
| 0.66 | 70 | 255 | 233 |
| 1.0 | 114 | 261 | 319 |
| 2.0 | 258 | 380 | >400 |
| 4.0 | 316 | >400 | |
| 6.0 | 362 | | |

In the absence of a dye the bandwidth is less than 50 nm. When a dye is used the bandwidth increases rapidly, even to values in excess of 400 nm. The centre of the bandwidth is always at approximately 555 nm. With this bandwidth and its position in the spectrum, substantially the entire visible portion of the spectrum is covered. Consequently, such a cholesteric polarizer can suitably be used as a broadband polarizer for the entire visible light spectrum.

Figure 4:
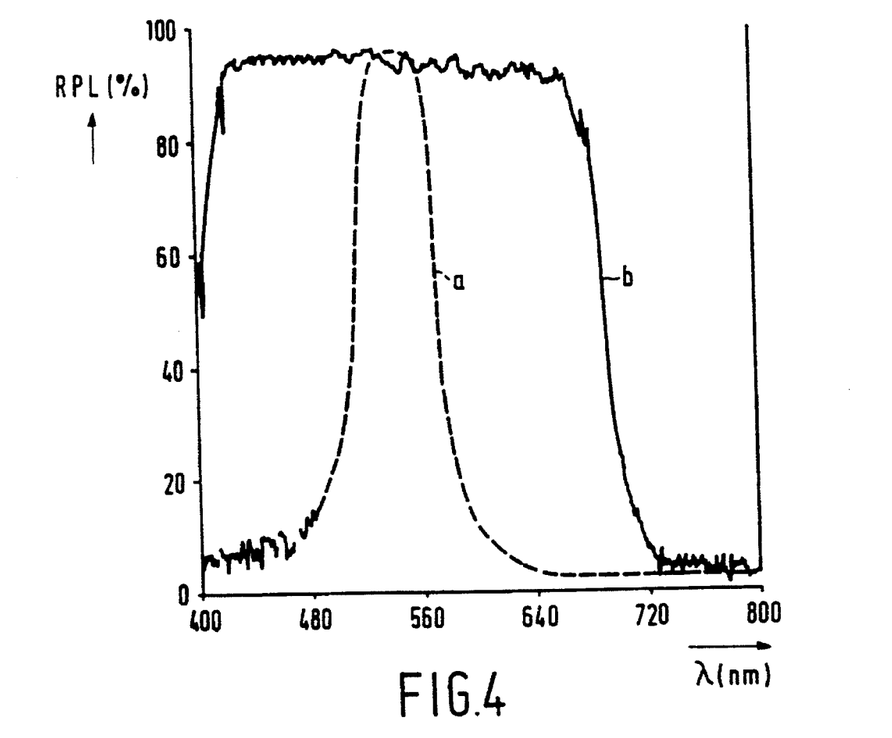
FIG. 4 shows a reflection spectrum of a cholesteric polarizer, the pitch of the molecular helix being (a) constant and (b) varied.

FIG. 4 shows a reflection spectrum of a polarizer in which the pitch is (a) constant and (b) in accordance with the first embodiment of the invention. The polarizers were exposed to circularly polarized light. Spectrum (a) was obtained in the absence of a dye. The bandwidth of this spectrum is therefore only approximately 45 nm. Spectrum (b) was obtained by using a dye during the polymerization process. The bandwidth of this filter is approximately 230 nm.

TABLE II

| wt. % dye | bandwidth (nm) |
|---|---|
| 0.00 | 37 |
| 0.13 | 68 |
| 0.17 | 82 |
| 0.26 | 109 |
| 0.41 | 168 |
| 0.58 | 308 |
| 0.71 | 326 |

Table II shows the bandwidths of a number of other cholesteric polarizers in accordance with the invention. Instead of the above-mentioned dye, the azo-dye SI-486 (Mitsui Toatsu Dyes Ltd) was added in certain concentrations for the manufacture of these polarizers. Said dye has an absorption maximum around 400 nm. In this case, the reactive mixture was polymerized with a UV-source (365 nm) having an incident power of 5 mW/cm$^2$ for 8 minutes. Table II also shows that the bandwidth increases with the quantity of dye.

Figure 5:
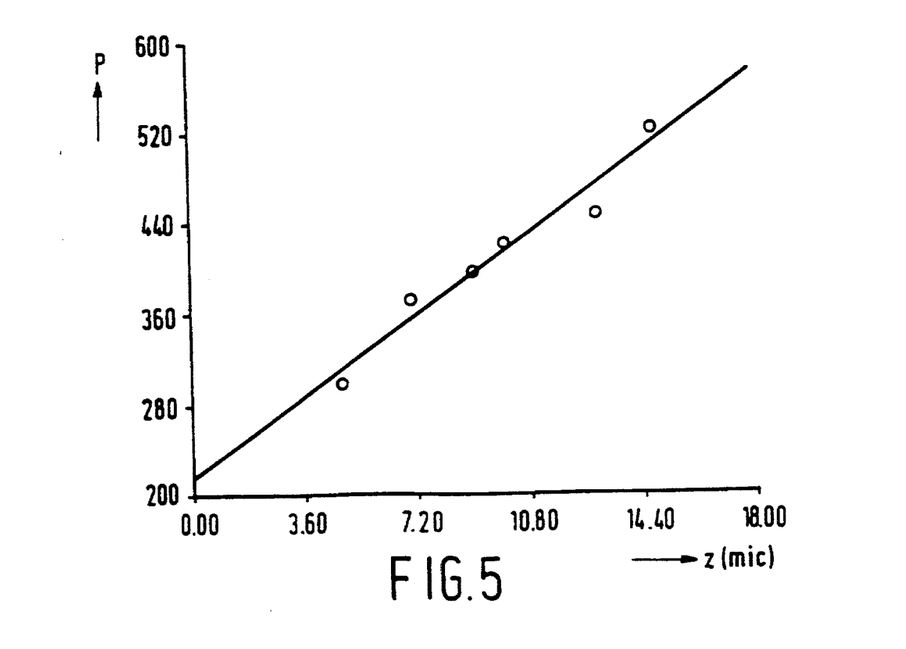
FIG. 5 shows a graph in which the variation of the pitch in the optically active layer of a polarizer in accordance with FIG. 1(a) is depicted.

FIG. 5 shows the change of the pitch as a function of the distance from one surface of an 18 micrometer thick polarizer to the other surface. This Figure was obtained by means of SEM photographs taken at the fracture face of cross-sections of this polarizer. The polarizer contained 0.72 wt. % of the above-mentioned azo-dye. The reflection band of the polarizer was approximately 350 to 800 nm. Due to the absorption band of the dye in the range in which the polarizer can be operated, said polarizer exhibited undesired absorptions around 400 nm.

Figure 1B:
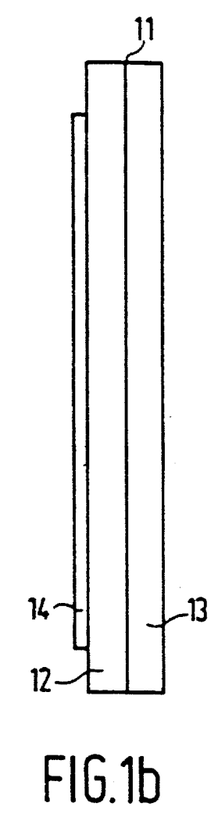

FIG. 1-b shows a second embodiment of a polariser in accordance with the invention. Said polarizer comprises a substrate 11 carrying an optically active layer 14. Said substrate 11 is composed of a first stretched synthetic resin film 12 of polypropylene and a second stretched synthetic resin film 13 of polycarbonate. The directions of stretching of both films extend substantially transversely to each other. The degree of stretching of both films was selected in such a manner that, at a wavelength of 590 nm, the optical retardation of the polypropylene film is 518 nm, while the optical retardation of polycarbonate in these conditions is 370 nm. Due to said choice of the conditions, the difference in dispersion between both films causes the optical retardation of the crossed films to be substantially equal to 0.25 times the wavelength over the entire wavelength range of from 400–700 nm.

A cholesteric polarizer in accordance with the second embodiment was manufactured as follows. The composite substrate described in the preceding paragraph was provided, by means of a doctor's blade, with a thin layer 14 (layer thickness 20 micrometers) of a mixture of reactive monomers. A number of comparative experiments showed that this layer could alternatively be provided by screen printing. The mixture contained both chiral and nematogenic monomers. Said two types of monomers had a different reactivity. The composition of the monomer mixture was as follows: 58.8 wt. % of component A, 39.2 wt. % of component B, 1 wt. % of the dye in accordance with FIG. 3, 1 wt. % of Igacure 651 (Ciba Geigy) and 100 ppm of p-methoxy phenol. After the layer had been provided, it was polymerized by means of an UV source (365 nm) to which the layer was exposed at 100° C. and a radiation intensity ranging from 0.06 to 0.6 mW/cm² for approximately 60 minutes. After the polymerization operation, the thickness of the optically active layer was approximately 18 micrometers.

Figure 6:
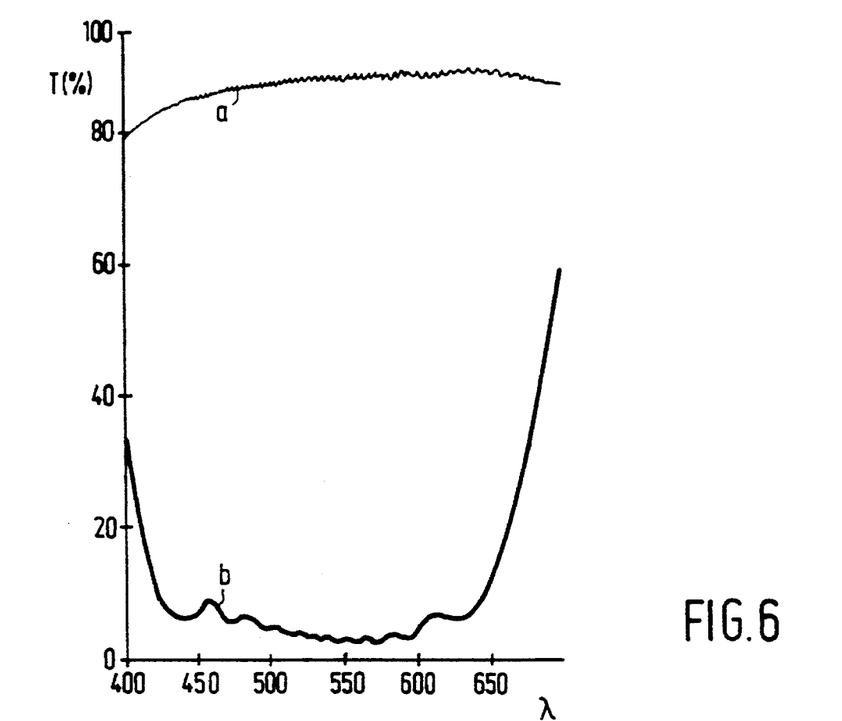
FIG. 6 shows a transmission spectrum of an inventive polariser in accordance with FIG. 1(b).

FIG. 6 shows a spectrum in which the transmission T is plotted as a function of the wavelength of a cholesteric polarizer in accordance with the second embodiment. Line (a) denotes the transmission of p-polarized light, while line (b) denotes the transmission of s-polarized light. The bandwidth of the filter was approximately 220 nanometers. It was found that the conversion from circularly polarized light to linearly polarized light was optimal over the entire bandwidth.

Figure 1C:
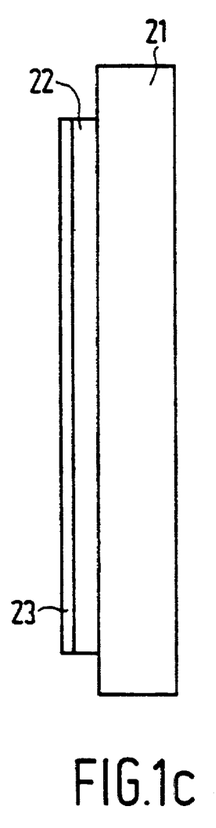

FIG. 1c shows a third embodiment of the polarizer in accordance with the invention. Said polarizer comprises a substrate 21 of a stretched synthetic resin film. In the present case, polycarbonate was used. The degree of stretching of the film was selected in such a manner that the birefringence at room temperature was 0.0029. The thickness of the substrate was 50 micrometers. With the substrate in question an optimum conversion of circularly polarized light into linearly polarized light was obtained at a wavelength of approximately 580 nm. This wavelength is situated in the centre of the reflection band of the broadband polarizer.

An optically active layer 22 of liquid crystalline material of cholesteric order is present on the substrate. The thickness of layer 22 was 20 micrometers. Layer 22 carries a top layer 23 of polymer material. Said layer, which has a thickness of approximately 2 micrometers, serves as a protective layer of the optically active layer.

Said third embodiment of the inventive broadband polarizer was manufactured as follows. An optically active layer of polymerised liquid crystalline material of cholesteric order was provided on the substrate. Techniques for applying such a layer are described in, inter alia, U.S. Pat. No. 5,132,147. In such a layer the molecular helix of the cholesteric material extends transversely to the layer. The pitch of said helix is substantially constant.

A thin layer of a mixture of reactive monomers was provided on the optically active layer. In the present case, a mixture of three different monomers was used in a volume ratio of 1:1:1. For the monomers use was made of butanediol diacrylate, octanediol acrylate and ethoxylated bisphenol-A diacrylate. A quantity of 4 wt. % of a photoinitiator was added to the mixture. The monomers diffuse in the optically active layer at different rates. This results in the formation of a concentration gradient of monomers in the optically active layer. This causes an increase of the pitch, said increase being proportional to the monomer concentration at the location of the optically active layer. After a diffusion time of 10 minutes at 60° C., the reactive monomers were polymerised to form a network by means of exposure to UV light at a wavelength of 365 nm. Said exposure took place at 60° C. and a radiation intensity of 0.5 mW/cm² for 5 minutes. This resulted in complete immobilisation of the monomers and stabilization of the concentration gradient. Since the monomer mixture was not completely diffused in the optically active layer in the polymerization operation, also a polymerised top layer (thickness 2 micrometers) was formed on the optically active layer.

Figure 7:
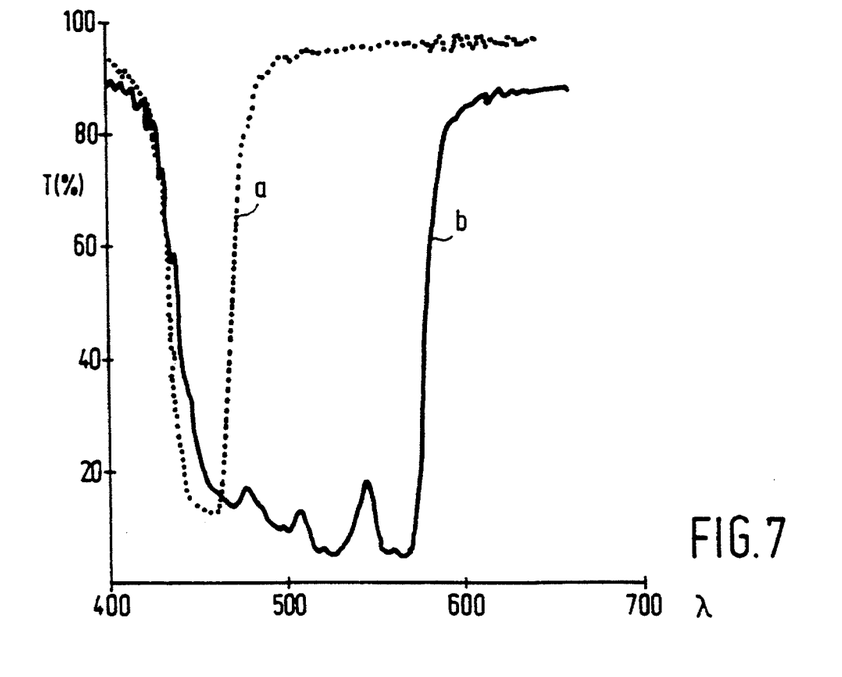
FIG. 7 shows a transmission spectrum of the inventive polariser in accordance with FIG. 1-c, (a) before diffusion and (b) after diffusion.

FIG. 7 shows a spectrum of the cholesteric polarizer in which the transmission T is plotted as a function of the wavelength. The incident light was circularly polarized. Spectrum (a) shows the transmission characteristic of the optically active layer before the diffusion of the monomers. Spectrum (b) shows the characteristic of the finished polarizer after the diffusion and polymerization of the monomers. Further measurements showed that the conversion of circularly polarized light into linearly polarized light was not optimal over the entire bandwidth of the inventive polarizer. Particularly in both edges of the band the conversion was not satisfactory. A better conversion can be obtained by using a composite substrate comprising two stretched synthetic resin films, the directions of stretching of both films extending substantially transversely to each other.

Figure 8:
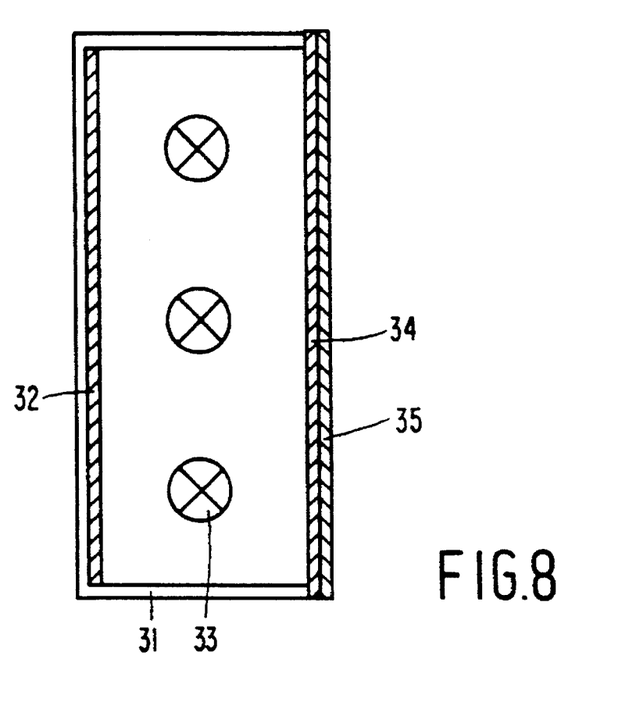
FIG. 8 is a diagrammatic sectional view of a first lighting device in accordance with the invention.

FIG. 8 is a diagrammatic sectional view of a first embodiment of the lighting device in accordance with the present invention. Said lighting device comprises a box-shaped housing 31, for example of synthetic resin, one inner surface of which is provided with a reflector 32 of vapour-deposited aluminium. In the housing there are accommodated three fluorescent lamps 32 as the electric light sources. Said lamps are detachably provided in corresponding sockets (not shown) via a threaded joint. It is alternatively possible to use a meander-shaped fluorescent tubular lamp instead of separate fluorescent lamps. The device also comprises a polarizer 34 having a quarter-wave plate 35. The polarizer is constructed as a broadband polarizer, as described in the foregoing embodiments.

When the device shown in FIG. 8 is in operation, the three fluorescent lamps generate unpolarized light. A part of this light falls directly on polarizer 4 which allows passage of one of the orthogonally linearly polarized components, whereas the other, "compatible", component is reflected. The reflected component is (partly) converted into the "incompatible" component on reflector 2 and reflected in the direction of the polarizer which allows passage of this "incompatible" component which is then converted into linearly polarized light by the quarter-wave plate. In this manner, the originally unpolarized light is converted into linearly polarized light with a high efficiency (approximately 80%).

Figure 9:
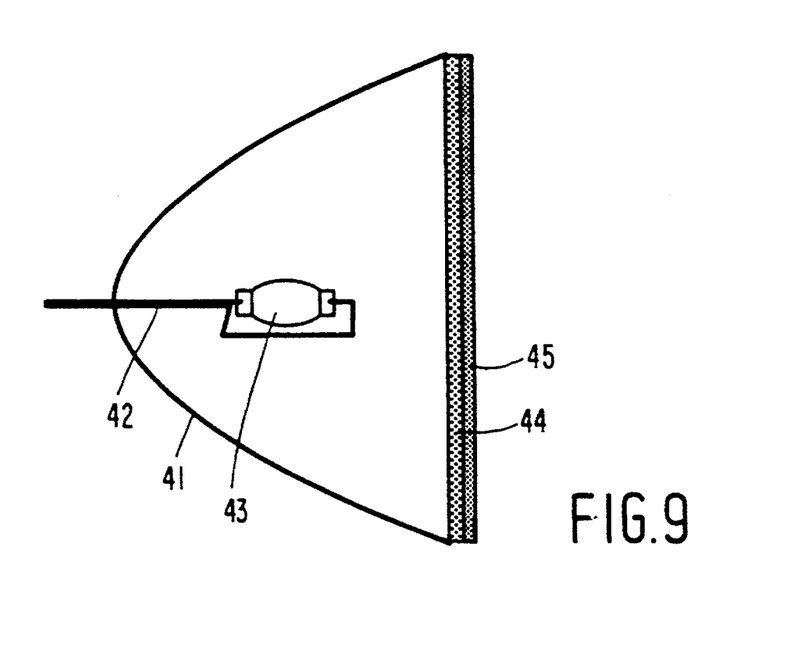
FIG. 9 is a diagrammatic sectional view of a second lighting device in accordance with the invention.

FIG. 9 is a diagrammatic sectional view of another embodiment of the inventive device. Said device comprises a parabolic, self-supporting reflector 41 of aluminium. Said reflector comprises a socket 42 for an electric light source which, in this case, consists of a detachable halogen lamp 43. The device further comprises a reflective polarizer 44 having a quarter-wave plate 45. The inventive device operates essentially in the same manner as the device of the foregoing embodiment. The embodiment shown in FIG. 9 can particularly suitably be used for car lighting or studio lighting.

We claim:

1. A cholesteric polarizer comprising an optically active layer of a polymer material, the polymer material having a cholesteric order and a molecular helix, the molecular helix having an axis extending transversely to the layer, wherein a pitch of the molecular helix in the layer varies with a difference between a maximum pitch and a minimum pitch of at least 100 nm, further characterized in that the optically active layer is present on a substrate of a stretched synthetic resin film, the degree of stretching and the thickness of the film being selected in such a manner that the optical retardation of the film is approximately 0.25 times the wavelength of the band reflected during operation of the polarizer.

2. A cholesteric polarizer comprising an optically active layer of a polymer material, the polymer material having a cholesteric order and a molecular helix, the molecular helix having an axis extending transversely to the layer, wherein a pitch of the molecular helix in the layer varies with a difference between a maximum pitch and a minimum pitch of at least 100 nm, further characterized in that the optically active layer is present on a substrate of two stretched synthetic resin films of different composition, the directions of stretching of both films extending substantially transversely to each other and the degree of stretching of both films being selected in such a manner that, due to a difference in dispersion between the films, the net retardation of the substrate is substantially equal to 0.25 times the wavelength over a substantial portion of the reflected band of the polarizer.

3. A method of manufacturing a cholesteric polarizer characterized in that a mixture of chiral and nematogenic monomers, each having a different reactivity, is provided in the form of a layer between two parallel substrates, after which actinic radiation is applied in accordance with a radiation profile whose intensity varies over the layer, so that the mixture is polymerized to an optically active layer of polymer material having a cholesteric order.

4. A method as claimed in claim 3, characterized in that the number of reactive groups of the chiral monomer differs from that of the nematogenic monomer.

5. A method as claimed in claim 4, characterized in that the mixture also comprises a dye having an absorption maximum whose wavelength corresponds substantially to the wavelength of the actinic radiation used.

6. A method as claimed in claim 3, further comprising removing the substrates from the optically active layer.

7. A method as claimed in claim 3, characterized in that the mixture also comprises a dye having an absorption maximum whose wavelength corresponds substantially to the wavelength of the actinic radiation used.

8. A method of manufacturing a cholesteric polarizer characterized in that a mixture of chiral and nematogenic monomers, each having a different reactivity, is provided on a substrate in the form of a layer, after which actinic radiation is applied in accordance with a radiation profile whose intensity varies over the layer, so that the mixture is polymerised to an optically active layer of polymer material having a cholesteric order.

9. A method as claimed in claim 8, characterized in that the mixture also comprises a dye having an absorption maximum whose wavelength corresponds substantially to the wavelength of the actinic radiation used.

10. A method as claimed in claim 8, characterized in that the number of reactive groups of the chiral monomer differs from that of the nematogenic monomer.

11. A method as claimed in claim 8, further comprising removing the substrate from the optically active layer.

12. A method of manufacturing a cholesteric polarizer comprising the steps of: providing an optically active layer of polymerised liquid crystalline material having a cholesteric order on a substrate, providing on a surface of the optically active layer of polymerised liquid crystalline material a film of reactive monomers which diffuse in the layer and cause a concentration gradient in the layer as a result of diffusion, and polymerising the monomers.

13. A method as claimed in claim 12, characterized in that the film comprises a mixture of monomers having different diffusion rates in the layer.

14. A method as claimed in claim 13, characterized in that at least a part of the monomers comprises two or more polymerisable groups.

15. A method as claimed in claim 12, characterized in that at least a part of the monomers comprises two or more polymerisable groups.

16. A lighting device comprising a socket for an electric light source, a reflector, and a cholesteric polarizer which is provided with a quarter-wave plate, characterized in that said cholesteric polarizer comprises an optically active layer of a polymer material, the polymer material having a cholesteric order and a molecular helix, the molecular helix having an axis extending transversely to the layer, wherein a pitch of the molecular helix in the layer varies with a difference between a maximum pitch and a minimum pitch of at least 100 nm, further characterized in that the optically active layer is present on a substrate of a stretched synthetic resin film, the degree of stretching and the thickness of the film being selected in such a manner that the optical retardation of the film is approximately 0.25 times the wavelength of the band reflected during operation of the polarizer.

17. A lighting device comprising a socket for an electric light source, a reflector, and a cholesteric polarizer which is provided with a quarter-wave plate, characterized in that said cholesteric polarizer comprises an optically active layer of a polymer material, the polymer material having a cholesteric order and a molecular helix, the molecular helix having an axis extending transversely to the layer, wherein a pitch of the molecular helix in the layer varies with a difference between a maximum pitch and a minimum pitch of at least 100 nm, further characterized in that the optically active layer is present on a substrate of two stretched synthetic resin films of different composition, the directions of stretching of both films extending substantially transversely to each other and the degree of stretching of both films being selected in such a manner that, due to a difference in dispersion between the films, the net retardation of the substrate is substantially equal to 0.25 times the wavelength over a substantial portion of the reflected band of the polarizer.

* * * * *